United States Patent
Okazaki et al.

(10) Patent No.: US 6,570,304 B1
(45) Date of Patent: May 27, 2003

(54) SPARK PLUG CAP AND SPARK PLUG FITTING METHOD

(75) Inventors: Koji Okazaki, Ichinomiya (JP); Masayoshi Matsui, Ichinomiya (JP); Takahiro Suzuki, Nagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 374 days.

(21) Appl. No.: 09/597,416

(22) Filed: Jun. 19, 2000

(30) Foreign Application Priority Data

Jun. 18, 1999 (JP) .......................................... 11-173035
May 15, 2000 (JP) ........................................ 2000-141776

(51) Int. Cl.⁷ .......................... H01T 13/08; H01R 13/44
(52) U.S. Cl. ........................ 313/118; 439/125; 324/402
(58) Field of Search ........................ 313/118, 119–130, 313/135, 143, 142; 324/402; 439/125, 127, 128

(56) References Cited

U.S. PATENT DOCUMENTS

| | | | |
|---|---|---|---|
| 4,123,688 A | * 10/1978 | Yoshikawa et al. | 123/169 R |
| 4,392,082 A | * 7/1983 | Harada | 313/118 |
| 5,487,676 A | * 1/1996 | Maruyama et al. | 324/399 |
| 5,672,812 A | * 9/1997 | Meyer | 313/118 |
| 5,955,826 A | 9/1999 | Suzuki et al. | 313/119 |

FOREIGN PATENT DOCUMENTS

| | | | |
|---|---|---|---|
| EP | 0 441 157 A | 8/1991 | |
| EP | 0 609 787 A | 8/1994 | |
| JP | 6-290853 | 10/1994 | H01T/13/40 |

* cited by examiner

*Primary Examiner*—Ashok Patel
*Assistant Examiner*—Karabi Guharay
(74) *Attorney, Agent, or Firm*—Sughrue Mion, PLLC (57) ABSTRACT

A spark plug cap for facilitating the fitting/detaching operation of a spark plug with a built-in pressure sensor, and a method of easily fitting the spark plug with a built-in pressure sensor are provided. The spark plug cap is provided with a cylindrical part of glass-containing PBT, a grommet provided with a cable passing groove, and an ignition coil unit provided with a high voltage terminal. The cylindrical part includes a first engagement part engageable with a spark plug fastening tool on one end, a second engagement part of a metal material engageable with a hexagonal part of the spark plug with a built-in pressure sensor on the other hand, and a groove-shaped clamp part on the outer side surface. By engaging the hexagonal part with the second engagement part to attach the cylindrical part to the spark plug, holding a sensor output cable by the clamp part, and fitting and fastening the spark plug fastening tool in the first engagement part, the spark plug is fitted into an internal combustion engine.

12 Claims, 8 Drawing Sheets

SPARK PLUG CAP AND SPARK PLUG FITTING METHOD

BACKGROUND OF THE INVENTION (i) Field of the Invention

The present invention relates to a spark plug cap which is fitted into the upper part of a spark plug with a built-in pressure sensor mounted on an internal combustion engine, and which has a conductive path for applying an igniting high voltage to the spark plug, and further to a method of fitting a spark plug with a built-in pressure sensor.

(ii) Description of the Related Art

In a conventional internal combustion engine, in order to generally control an engine operation, the operation state of the internal combustion engine is detected. For example, by detecting the pressure (cylinder inner pressure) in a combustion chamber, the miss fire or knocking can be sensed, and the fuel consumption ratio can be enhanced. Moreover, known as a pressure sensor for measuring this cylinder inner pressure is a pressure sensor which is disposed on a spark plug attachment seat and which detects the cylinder inner pressure by the variation of a spark plug tightening load and outputs an electric signal from a sensor output cable in accordance with the detected pressure.

However, in order to introduce the electric signal from this pressure sensor to external apparatuses such as an electronic controller, it is necessary to secure a space for laying the sensor output cable upward from below a metal shell of the spark plug on the outer peripheral part of the metal shell. Particularly, when a coil is disposed in a spark plug hole, there is little clearance between the inner surface of the spark plug hole and the outer surface of the coil. Therefore, a channel for passing the sensor output cable has to be formed in the spark plug hole, a spark plug hole shape becomes complicated, and there arises a problem that the cost increases. On the other hand, when the entire diameter of the spark plug hole is enlarged so as to pass the sensor output cable, the spark plug hole shape does not become complicated. However, when the attachment angles of suction and exhaust valves are designed for a purpose of enhancing the performance of the internal combustion engine, it is desirable to minimize the diameter of the spark plug hole positioned between the suction valve and the exhaust valve.

In order to satisfy such request, a spark plug with a built-in pressure sensor is proposed as a pressure measuring apparatus (see Japanese Patent Application Laid-Open No. H6-290853, U.S. Pat. No. 5,955,826, EP609787). In the spark plug with a built-in pressure sensor, a piezoelectric element is disposed in the mounting base of a metal shell, the cylinder inner pressure of the internal combustion engine is detected by detecting the change of a tightening load of the spark plug, and a sensor output cable for outputting the electric signal in accordance with the detected pressure is guided from the upper part of the metal shell. Consequently, the sensor output cable can be extracted from the spark plug hole without enlarging the diameter of the spark plug hole. This can secure a wide space for disposing the mechanism of the suction and exhaust valves in a cylinder head, and it is therefore possible to design the attachment angles of the suction and exhaust valves for a purpose of enhancing the performance of the internal combustion engine.

Furthermore, the spark plug with a built-in pressure sensor is fitted into the bottom part of the spark plug hole of an internal combustion engine via a male screw (screw groove) disposed in the metal shell, and a gap between a center electrode and a ground electrode for generating sparks is disposed in a cylinder. Moreover, when the sensor output cable is extracted from the spark plug hole, and connected to the external apparatuses such as the electronic controller, the cylinder inner pressure detected by the spark plug is used for detecting the operation state of the internal combustion engine, for example, in the internal combustion engine operation control processing executed by the electronic controller.

However, the spark plug with a built-in pressure sensor is not easily fitted into the internal combustion engine because of the presence of the sensor output cable. Specifically, since the spark plug is fitted into the internal combustion engine by the male screw disposed on the metal shell, there arises a problem that the sensor output cable is wound around fastening tools such as a plug wrench during fitting operation.

In order to prevent the sensor output cable from being wound, it is necessary to move the sensor output cable with the rotation of the spark plug during the spark plug fitting operation, which requires much labor and makes difficult the spark plug fitting operation.

On the other hand, the plug wrench as the fastening tool for the spark plug with a built-in pressure sensor has an engagement part with the spark plug, which is provided with a groove for passing the sensor output cable extended from the metal shell. However, when the fastening operation is performed in a float state without noticing that the engagement part of the plug wrench incompletely engages with the hexagonal part of the spark plug, the sensor output cable is sometimes caught in the plug wrench groove by mistake When the plug wrench is rotated in this state, the sensor output cable is pulled, and falls from the metal shell.

The falling of the sensor output cable occurs not only during the fitting of the spark plug but also during the detaching of the spark plug.

Moreover, in order to depress the noise influence from the outside, the sensor output cable may be covered with a mesh (shield lines) formed of stainless steel or another metal. For the spark plug with a built-in pressure sensor provided with the sensor output cable covered with the metal mesh, during the fastening operation for the attachment to the internal combustion engine, when the sensor output cable contacts the spark plug hole, the metal mesh scrapes and damages the inner wall surface of the spark plug hole in some cases. Moreover, when the scrapings resulting from the scraping of the spark plug hole inner surface are caught between the spark plug and the cylinder head, the screw groove may be damaged or the air tightness of the combustion chamber may be deteriorated. Additionally, when the shield lines of the sensor output cable are ruptured by the friction of the sensor output cable with the spark plug hole inner wall surface, the effect of reducing the influence of the noises such as an ignition noise from the outside is deteriorated.

Additionally, a spark plug cap connected to a high voltage terminal is fitted into the spark plug with a built-in pressure sensor mounted on the internal combustion engine in order to connect the spark plug terminal electrode to the high voltage terminal of an ignition coil. However, when the spark plug cap is mounted on the spark plug positioned in the bottom part of the spark plug hole, since it becomes difficult to insert the spark plug cap into the spark plug hole, the spark plug hole is narrow and the sensor output cable offers an obstruction.

SUMMARY OF THE INVENTION

Wherefore, an object of the present invention is to provide a spark plug cap which facilitates the detaching/fitting operation of a spark plug with a built-in pressure sensor with respect to an internal combustion engine, fails to scrape a spark plug hole inner surface, and which is easily fitted into the spark plug.

Another object of the present invention is to provide a method of easily fitting a spark plug with a built-in pressure sensor.

To attain this and other objects, according to the present invention, there is provided a cylindrical spark plug cap which is fitted into a spark plug with a built-in pressure sensor and which includes a conductive path for applying an igniting high voltage to the spark plug and an insulating member for insulating the conductive path. The spark plug cap is provided with: a cylindrical member including a first engagement part for engaging with a fastening tool on one end, and a second engagement part for engaging with a metal shell to fasten the spark plug on the other end; and a cable engaging part for extending a sensor output cable through the cylindrical member from an end on a first engagement part side to an end on a second engagement part side.

Moreover, there is provided a method of using the spark plug cap and fitting the spark plug with a built-in pressure sensor into a spark plug hole in an internal combustion engine. The method includes the steps of: engaging the second engagement part of the cylindrical member with the spark plug; engaging the sensor output cable with the cable engaging part of the cylindrical member; fitting the fastening tool in the first engagement part of the cylindrical member; rotating the fastening tool while the sensor output cable engages with the cable engaging part; and screwing the spark plug to the spark plug hole of the internal combustion engine.

When the spark plug cap is used, during the fitting of the spark plug into the internal combustion engine, the sensor output cable rotates around the cylindrical member simultaneously with the rotation of the plug wrench, the cable fails to be wound around the plug wrench.

By providing the cable engaging part with a groove which has a sectional shape for substantially accommodating the sensor output cable, the metal mesh covering the sensor output cable fails to scrape the inner wall defining the spark plug hole, the screw groove is prevented from being damaged by the scrapings caught between the spark plug and the cylinder head, and the air tightness in the combustion chamber can be prevented from being deteriorated.

Moreover, in the above-described constitution, during the spark plug fitting operation in a state in which the spark plug cap is fitted into the upper part of the spark plug with a built-in pressure sensor, the first engagement part can be positioned in a spark plug hole shallow area or an area outside the spark plug hole, and the plug wrench can therefore securely engage with the first engagement part. This avoids the disadvantage caused by the fastening operation while the plug wrench is incompletely fitted, and prevents the sensor output cable from being caught in the groove of the plug wrench and from falling off.

The spark plug cap is provided with the conductive path for applying the igniting high voltage to the spark plug disposed in the bottom part of the spark plug hole. Therefore, even after the spark plug fitting operation, the spark plug cap is disposed in the spark plug hole while the spark plug cap is fitted into the spark plug with a built-in pressure sensor. Moreover, even during the detaching of the spark plug, similarly as during the fitting, the spark plug can be rotated while the sensor output cable engages with the cable engaging part of the spark plug cap. Therefore, even during the detaching of the spark plug, the sensor output cable is prevented from being caught in the cable passing groove disposed in the engaging part of the spark plug fastening tool and from falling off.

Furthermore, the spark plug cap of the present invention is fitted into the spark plug with a built-in pressure sensor before mounted on the internal combustion engine. Therefore, different from a case in which the spark plug is first mounted on the internal combustion engine and the plug cap is then fitted into the spark plug in the spark plug hole, the sensor output cable offers no obstruction, and the spark plug cap fitting operation is facilitated.

BRIEF DESCRIPTION OF THE DRAWINGS

Preferred embodiments of the present invention will be described hereinafter with reference to the drawings, in which.

DETAILED DESCRIPTION OF PREFERRED EMBODIMENTS

First Embodiment

Figure 1:
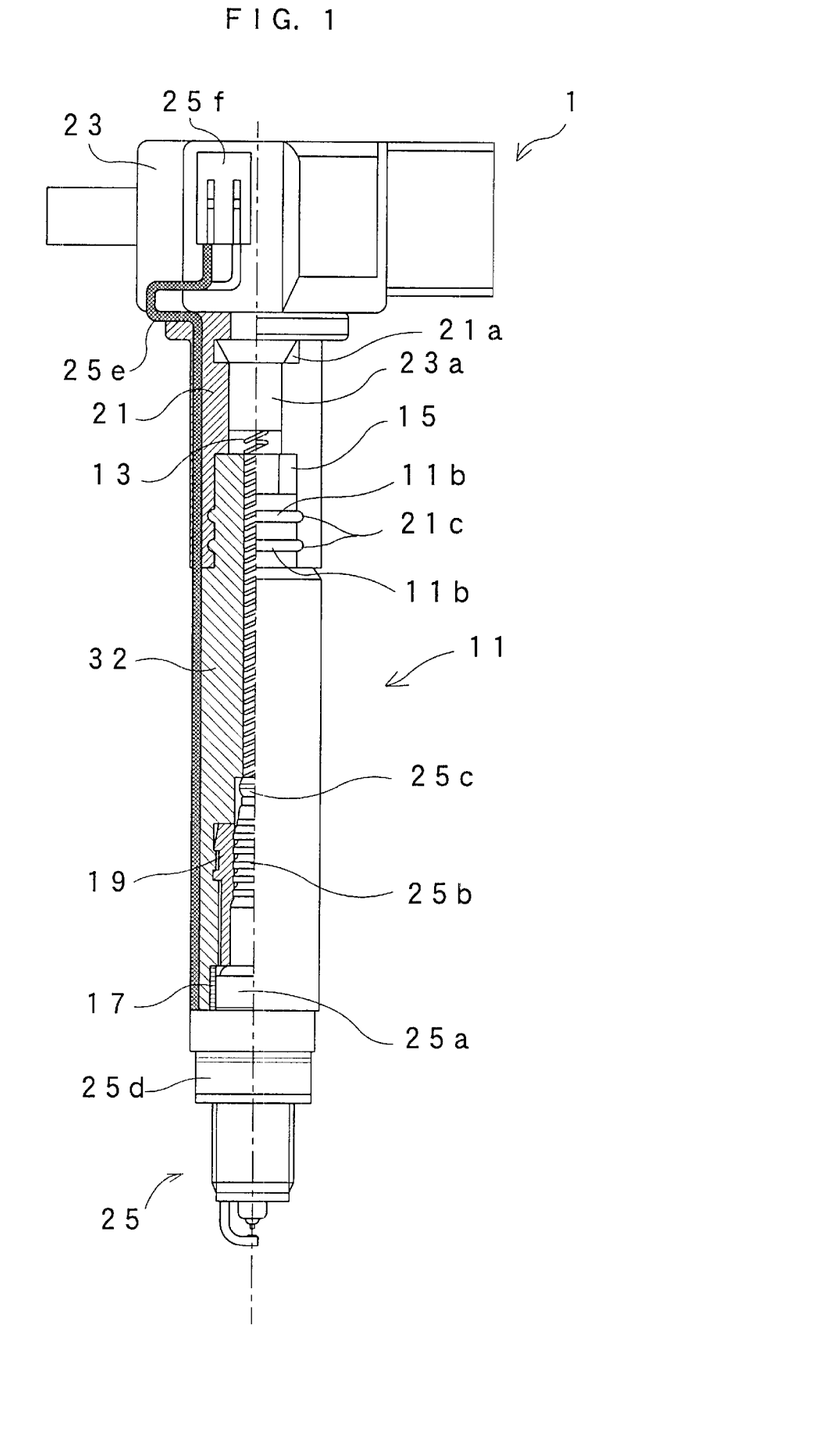
FIG. 1 is a schematic view showing the constitution of a spark plug cap of a first embodiment.
Figure 2:
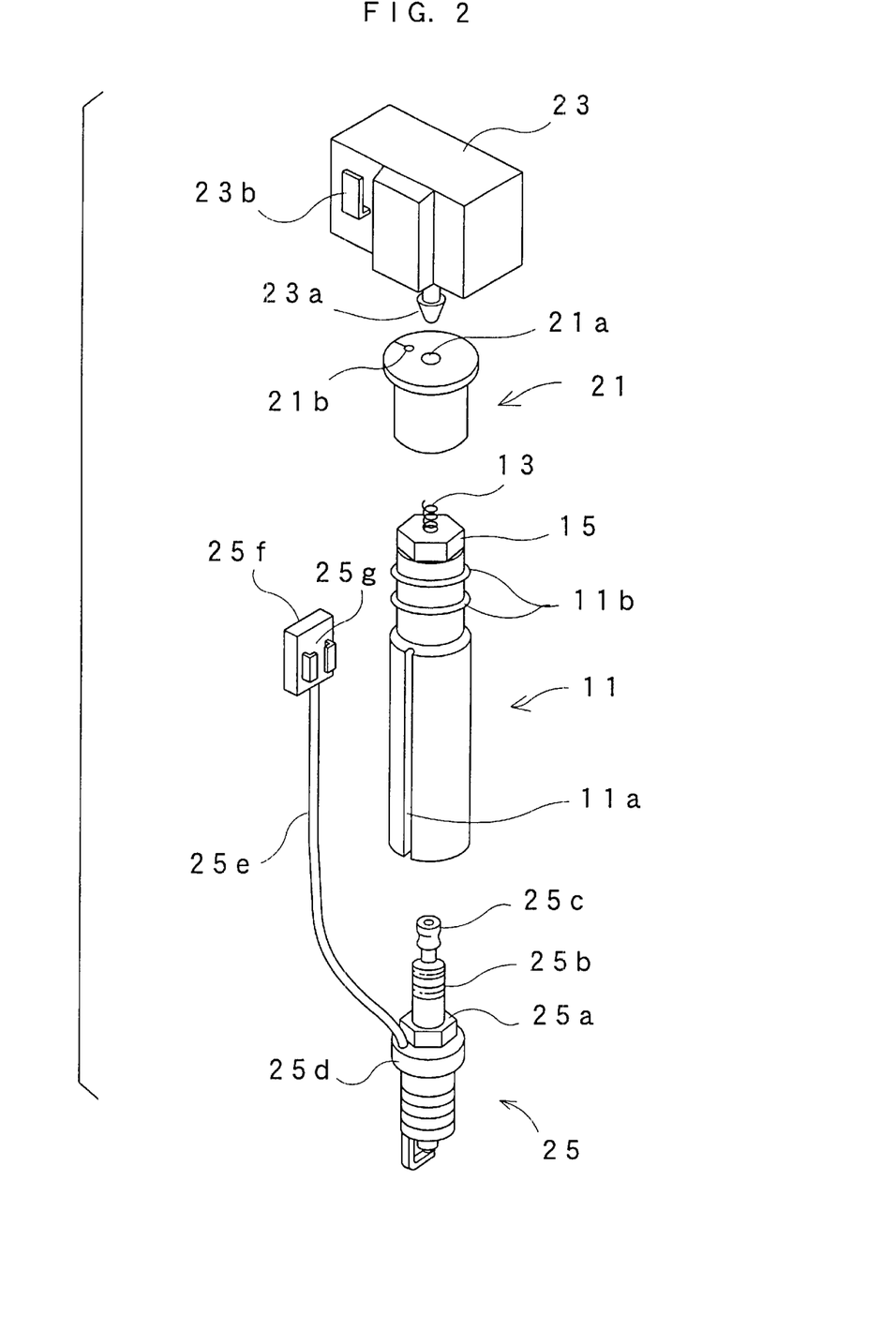
FIG. 2 is a perspective view showing that the spark plug cap of the first embodiment is exploded.

As shown in FIGS. 1 and 2, in a first embodiment, a spark plug cap 1 is provided with: a cylindrical part 11 which can engage with a spark plug with a built-in pressure sensor (hereinafter referred to also as the spark plug) 25 on an end; a rubber grommet 21 for covering the opening end of an internal combustion engine spark plug hole for accommodating the spark plug 25 and cylindrical part 11; and an ignition coil unit 23 for outputting an igniting high voltage.

Moreover, the cylindrical part 11 includes a cylindrical insulating member 32 formed of glass-containing polybutylene terephthalate (PBT) and having an outer diameter of 23 mm. In the cylindrical part 11, a spring 13, formed of a conductive material, is extended along a center axis in a longitudinal direction. Moreover, one end of the cylindrical part 11 is provided with a first engagement part 15 having a hexagonal shape engageable with a fastening tool and the other end thereof is provided with a second engagement part 17 formed of a metal material having a recessed hexagonal shape engageable with a hexagonal part 25a to tighten the spark plug 25 on a base seat in a plug hole of an internal combustion engine. Furthermore, the cylindrical part 11 is provided with a rubber spark plug contact part 19 which can hold an insulator 25b of the spark plug 25 on the inner wall adjacent to the second engagement part 17. Moreover, as shown in FIG. 2, on the outer side surface of the cylindrical part 11, a groove-shaped clamp part 11a with a depth of 1.5 mm and opening width of 1.5 mm is extended in the longitudinal direction. The size of the groove section of the clamp part 11a is sufficient for substantially accommodating a sensor output cable 25e described later.

Additionally, since both ends of the spring 13 abut on a high voltage terminal 23a protruded from the ignition coil unit 23 and a terminal part 25c of the spark plug 25, respectively, a conductive path for supplying the igniting high voltage generated in the ignition coil unit 23 to the spark plug 25 is formed.

Moreover, it is preferable to set the sizes of the first engagement part 15 and second engagement part 17 to be suitable for the sizes of the fastening tool and the hexagonal part 25a of the spark plug 25. In the first embodiment, the distance between the opposite sides of the first engagement part 15 is 13 mm, and the size of the recessed hexagonal shape of the second engagement part 17 is set to be engageable with the hexagonal part 25a whose distance between the opposite sides is 14 mm. Additionally, the second engagement part 17 is attached to the end of the cylindrical part 11 by press insertion or molding glass containing PBT in the molding die containing the second engagement part 17 (insert molding).

Moreover, the grommet 21 is provided with a through hole 21a for introducing, into the spark plug hole, the high voltage terminal 23a which forms the conductive path for applying the igniting high voltage to the spark plug 25. Furthermore, the inner peripheral surface of the grommet 21 is also symmetrical with respect to the center axis of the cylindrical part 11. Therefore, the grommet 21 is rotated by any angle about the center axis of the cylindrical part 11, While the grommet 21 is attached to the cylindrical part 11. Moreover, as shown in FIG. 2, a cable passing groove 21b is formed in the top end surface of the grommet 21, so that the sensor output cable 25e extended from the upper part of the metal shell of the spark plug 25 is drawn out of the spark plug hole. Since the grommet 21 is formed of rubber or resin, the grommet 21 can easily be worked in order to form the cable passing groove 21b. The cable passing groove 21b also acts as a vent for discharging ozone generated in the spark plug hole.

Furthermore, as shown in FIG. 2, the high voltage terminal 23a for outputting the igniting high voltage is protruded from the ignition coil unit 23, and the ignition coil unit 23 is also provided with a connector fixing part 23b for fixing a connector 25f connected on the tip end of the sensor output cable 25e to be connected to the external apparatus. For the connector fixing part 23b, the middle part of a plate body protruded in a horizontal direction from the side surface of the ignition coil unit 23 is bent in a vertical direction, the end of the bent part is directed upward, and the sectional shape of the plate body is thus formed in an L-shape. When the edge of the connector fixing part 23b is engaged with an attachment part 25g of the connector 25f, the connector 25f is fixed to the connector fixing part 23b.

A method of fitting the spark plug 25 into an internal combustion engine using the spark plug cap 1 of the first embodiment will next be described.

First, in order to fit the spark plug 25 into the internal combustion engine, by inserting the hexagonal part 25a of the metal shell 25d into the second engagement part 17, and holding the insulator 25b of the spark plug 25 by the spark plug contact part 19, the cylindrical part 11 engages with the spark plug 25. In this case, the sensor output cable 25e extended from the upper part of the metal shell 25d of the spark plug 25 is adapted to be positioned in the end of the clamp part 11a disposed in the outer side surface of the cylindrical part 11.

Subsequently, by inserting the sensor output cable 25e extended from the upper part of the metal shell 25d of the spark plug 25 into the groove of the clamp part 11a disposed in the outer side surface of the cylindrical part 11, the sensor output cable 25e is extended to the second engagement part 17 from the first engagement part 15. Subsequently, by inserting an assembly of the cylindrical part 11 and spark plug 25 into the internal combustion engine spark plug hole from the side of the spark plug 25, fitting the tool such as the wrench in the first engagement part 15 to rotate the cylindrical part 11 and spark plug 25, and screwing and tightening the spark plug 25, the assembly can be attached to the internal combustion engine.

Thereafter, the grommet 21 is fitted into the end of the cylindrical part 11 so that an annular protrusion 11b disposed parallel to the top end surface of the cylindrical part 11 on the outer side surface adjacent to the first engagement part 15 engages with an annular groove part 21c disposed in the inner wall of the grommet 21. Since the grommet 21 is attached to the cylindrical part 11 in this manner, the spark plug hole is covered with the grommet 21, so that water can be prevented from entering the spark plug hole. In this case, the sensor output cable 25e is extracted from the spark plug hole through the cable passing groove 21b of the grommet 21, and the grommet 21 is attached to the cylindrical part 11 in consideration of the attachment direction of the grommet 21 so that the extraction position of the sensor output cable 25e is optimum.

Subsequently, the high voltage terminal 23a of the ignition coil unit 23 is inserted into the through hole 21a of the grommet 21 disposed in the spark plug hole, and the ignition coil unit 23 is fixed to the internal combustion engine main body by a fixing bolt (not shown). Furthermore, the tip-end connector 25f connected to the sensor output cable 25e is attached to the connector fixing part 23b of the ignition coil unit 23, and the connector 25f is connected to a complementary connector connected to the external apparatuses such as the electronic controller.

When the spark plug cap 1 of the first embodiment is used, the spark plug 25 is fitted into the internal combustion engine main body by the above-described fitting method procedure.

As described above, when the spark plug 25 is fitted into the internal combustion engine main body using the spark plug cap 1 of the first embodiment, the sensor output cable 25e fails to be wound around the plug wrench, and it is therefore unnecessary to move the sensor output cable 25e extended from the spark plug 25 with the rotation of the spark plug 25. Moreover, the sensor output cable 25e is disposed and fitted in the clamp part 11a. Therefore, even when the sensor output cable 25e is covered with the mesh or shield lines formed of stainless steel or another metal, the sensor output cable 25e fails to scrape the spark plug hole inner wall. Additionally, the shield lines of the sensor output cable 25e is prevented from being damaged or ruptured.

Furthermore, while the spark plug cap 1 is fitted into the upper part of the spark plug with a built-in pressure sensor 25, during the spark plug fitting operation, the first engagement part 15 is positioned in the shallow part of the spark plug hole, or outside the spark plug hole. Therefore, the plug wrench can securely engage with the first engagement part 15. This prevents the sensor output cable 25e from being caught in the cable passing groove disposed in the plug wrench engaging part and from being falling off.

Additionally, even after the spark plug fitting operation, the spark plug cap 1 is disposed in the spark plug hole and engages with the spark plug with a built-in pressure sensor 25. Even during the detaching of the spark plug, while the sensor output cable 25e is held in the clamp part 11a of the spark plug cap 1, the spark plug 25 can be rotated. Therefore, even during the detaching of the spark plug, the sensor output cable 25e fails to fall off.

Furthermore, since the spark plug cap 1 is first fitted into the spark plug with a built-in pressure sensor 25 and then mounted on the internal combustion engine, different from the case in which the spark plug is first mounted on the internal combustion engine and then the spark plug cap is fitted into the spark plug 25 in the spark plug hole, the sensor output cable 25e offers no obstacle, and the fitting operation of the spark plug cap 1 is facilitated.

Moreover, since the cylindrical part 11 is formed of glass-containing PBT with a high strength, and the second engagement part 17 is formed of the metal material, the spark plug cap 1 is strong enough to bear a spark plug tightening torque of 2.5 kg-m, and the spark plug 25 can securely be tightened.

Furthermore, the cylindrical part 11 is formed by PBT superior in insulating properties. Therefore, the insulating performance is very high. The spring 13 forming the conductive path for connecting the spark plug 25 to the ignition coil unit 23 is insulated from the internal combustion engine main body. Additionally, since the inner wall of the cylindrical part 11 abutting on the spark plug 25 is formed by the rubber spark plug contact part 19, dielectric breakdown is prevented from occurring between the terminal part 25c and the metal shell 25d.

Moreover, since the maximum outer diameter of the cylindrical part 11 is 23 mm, the insertion even into a small spark plug hole with a diameter of 24 mm is possible. Additionally, when the diameter of the spark plug hole is 24 mm, a wide space for disposing the mechanism of suction and exhaust valves in the cylinder head can be secured. Therefore, by using the spark plug cap 1 of the first embodiment, the attachment angles of the suction and exhaust valves can be designed for a purpose of enhancing the internal combustion engine performance.

Furthermore, for the shape of the grommet 21, even when the grommet 21 is rotated by any angle about the center axis of the cylindrical part 11, the grommet 21 can be attached to the cylindrical part 11. Therefore, since the position of the cable passing groove 21b can be changed by rotating the grommet 21, the sensor output cable 25e can be extracted from the optimum position.

Additionally, since the conductive path from the high voltage terminal 23a of the ignition coil unit 23 to the terminal part 25c of the spark plug 25 is short, the igniting high voltage can efficiently be used as a spark energy. Moreover, by fixing the ignition coil unit 23 to the internal combustion engine main body by the fixing bolt (not shown), the grommet 21 with the high voltage terminal 23a inserted therein, and the cylindrical part 11 engaging with the grommet 21 are also fixed to the internal combustion engine main body, and the spark plug cap 1 can be prevented from colliding against the spark plug hole by vibration.

Therefore, according to the spark plug cap 1 of the first embodiment, the spark plug with a built-in pressure sensor 25 can easily be fitted and detached without damaging the sensor output cable 25e.

Additionally, needless to say, the first engagement part 15 may be formed of the metal material.

Second Embodiment

A second embodiment will next be described in which the strength of the cylindrical part 11 is enhanced.

Figure 3:
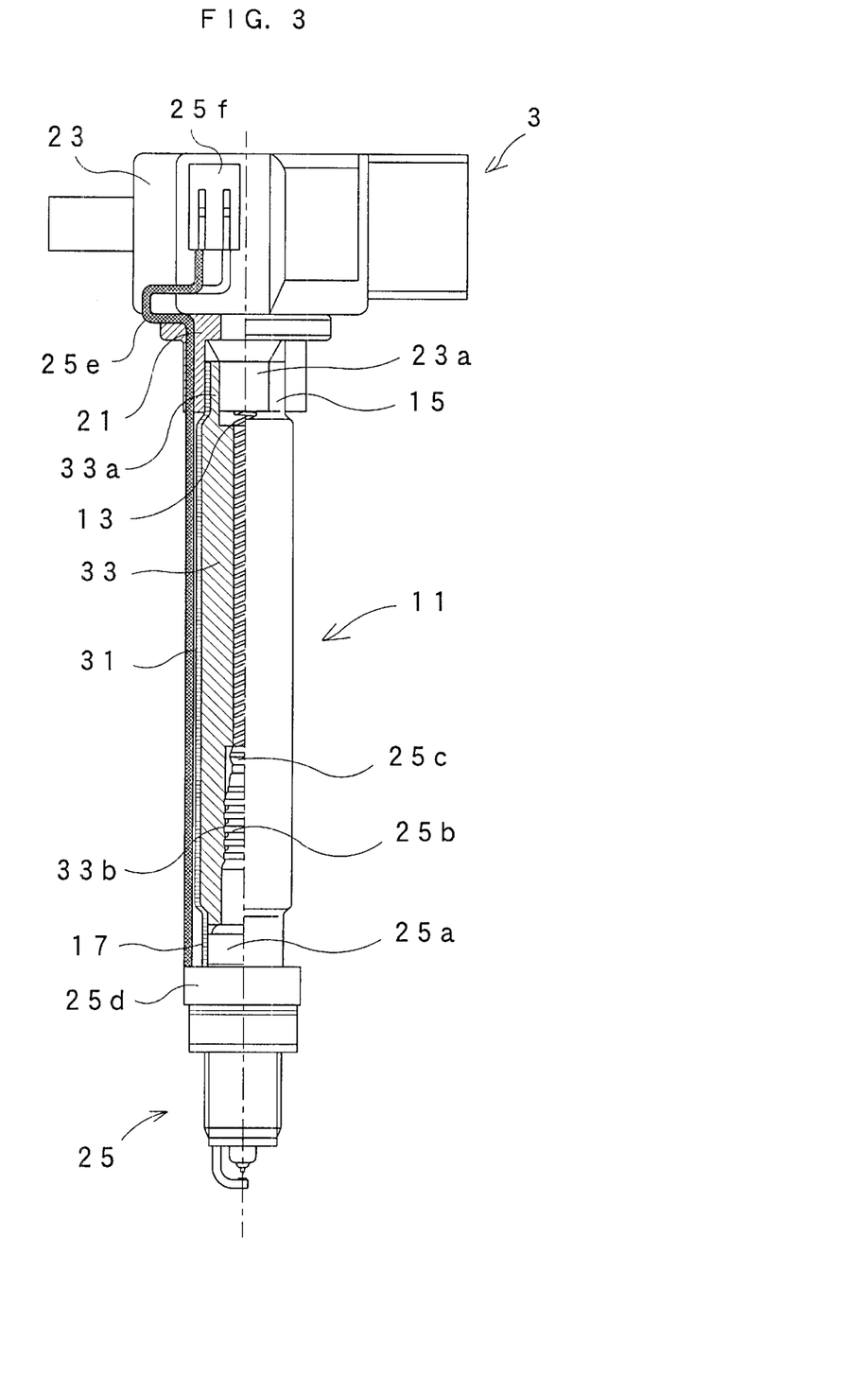
FIG. 3 is a schematic view showing the constitution of the spark plug cap of a second embodiment.

As shown in FIG. 3, a spark plug cap 3 of the second embodiment is provided with the cylindrical part 11, grommet 21, and ignition coil unit 23. Moreover, in the spark plug cap 3 of the second embodiment, the ignition coil unit 23 is similar to the ignition coil unit 23 of the first embodiment, and the grommet 21 has substantially the same shape as that of the grommet 21 of the first embodiment, except that it is shorter than that of the first embodiment along a center axis direction, and includes a cable passing groove in its top end surface. Moreover, the method of fitting the spark plug 25 into the internal combustion engine main body is similar to that of the first embodiment. Therefore, the structure of the cylindrical part 11, which is different from that of the first embodiment, will be described hereinafter with reference to FIGS. 3, 4.

Figure 4:
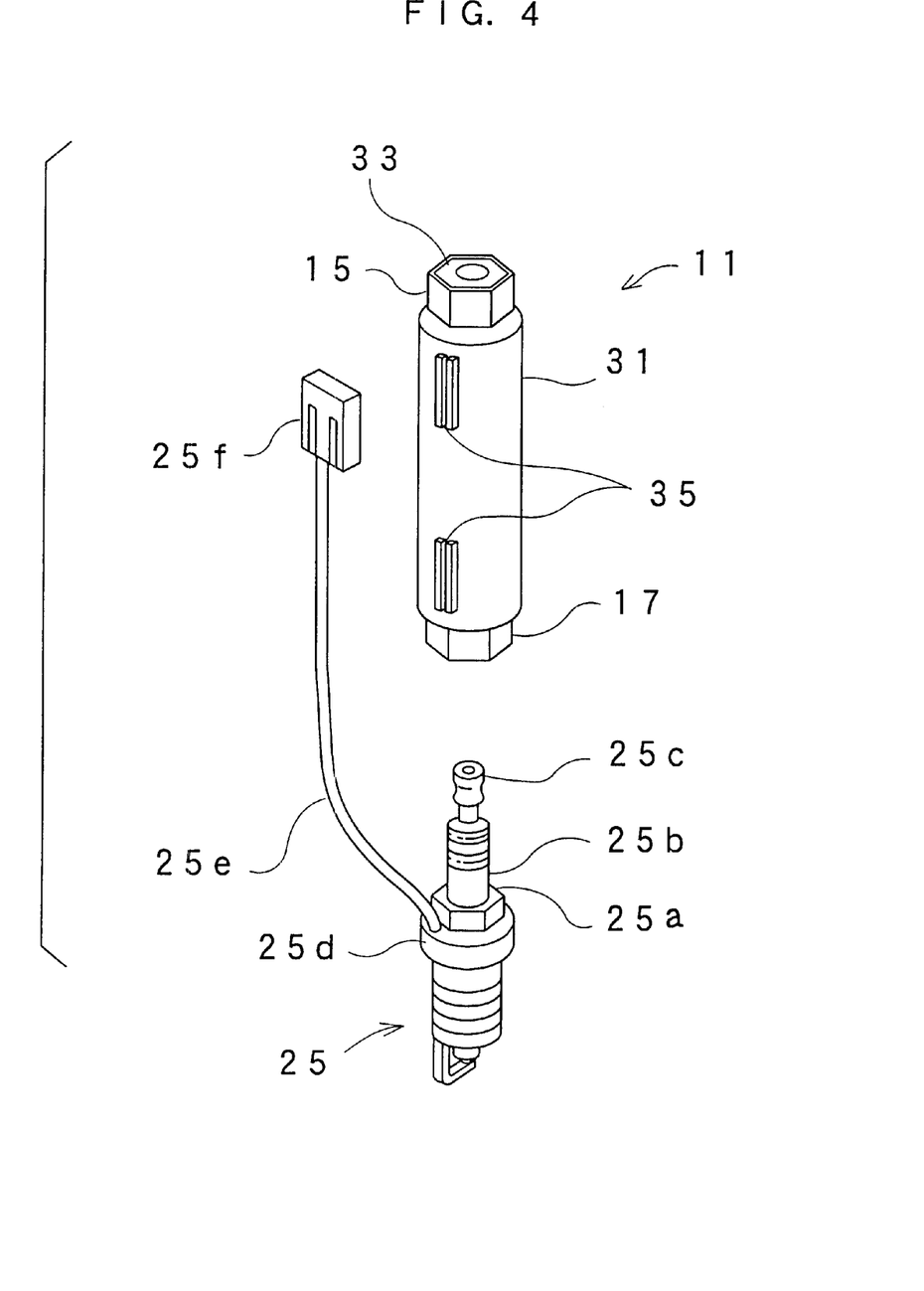
FIG. 4 is a perspective view of a cylindrical part constituting the spark plug cap of the second embodiment.

As shown in FIG. 3, the cylindrical part 11 of the spark plug cap 3 of the second embodiment is constituted mainly of a cylindrical housing 31 of a metal material with an outer diameter of 20 mm. Moreover, one end of the housing 31 is provided with the hexagonal first engagement part 15 which can engage with the spark plug fastening tool, and the other end thereof is provided with the recessed hexagonal second engagement part 17 which can engage with the hexagonal part 25a disposed to fasten the spark plug 25. Moreover, a rubber insulating part 33 is formed inside the housing 31 by insert molding, so that the spring 13 of the conductive material can be extended along the center axis of the housing 31 in the longitudinal direction. Moreover, the inner wall of the first engagement part 15 is provided with a high voltage terminal contact part 33a shaped so that the high voltage terminal 23a of the ignition coil unit 23 can be held. Moreover, the inner wall adjacent to the second engagement part 17 on the side of the first engagement part 15 is provided with a spark plug contact part 33b shaped so that the insulator 25b of the spark plug 25 can be held. Furthermore, as shown in FIG. 4, two protruded clamp parts 35 extended in the longitudinal direction with a height of 1.5 mm are disposed at two places on the outer side surface of the cylindrical part 11. When the protruded clamp part 35 holds the sensor output cable 25e between two protrusions with an interval of 1.5 mm, the sensor output cable 25e can be held.

Additionally, both ends of the spring 13 abut on the high voltage terminal 23a protruded from the ignition coil unit 23 and the terminal part 25c of the spark plug 25, and the conductive path for supplying the igniting high voltage generated in the ignition coil unit 23 to the spark plug 25 is formed.

Moreover, in the second embodiment, the distance between the opposite sides of the first engagement part 15 is 13 mm, and the recessed hexagonal shape of the second engagement part 17 can engage with the hexagonal part 25a whose distance between opposite sides is 14 mm.

Additionally, for the hexagonal part 25a of the spark plug 25, it is difficult to set the distance between the opposite sides to 14 mm or less. In that case, the outer diameter of the insulator 25b has to be decreased, and the strength cannot easily be secured. On the other hand, the distance between the opposite sides of the first engagement part 15 can easily be set to be thinner than the hexagonal part 25a of the spark plug 25. This is because the strength of this part can easily be secured. Therefore, since the spark plug cap 3 can be fastened with a wrench smaller than the plug wrench for fastening the spark plug 25, the sensor output cable 25e can further be prevented from being damaged.

As described above, according to the spark plug cap 3 of the second embodiment, since the cylindrical part 11 is constituted mainly of the housing 31 of the metal material, the strength against the spark plug fastening torque increases. Moreover, even when the spark plug cap 3 provided with the cylindrical part 11 formed mainly of the metal material is formed to have a smaller diameter than that of the cylindrical part 11 formed mainly of the resin material according to the first embodiment, the strength for bearing against the spark plug fastening torque can be realized. Therefore, when the spark plug cap 3 of the second embodiment is used, the diameter of the spark plug hole can be smaller, and a wide space for disposing the mechanism of the suction and exhaust valves in the cylinder head can be secured.

Moreover, when the end of the housing 31 is worked to form the first engagement part 15 and second engagement part 17, the cylindrical part 11 can be realized so that the metal material integrally forms the first engagement part 15 to the second engagement part 17. Therefore, the strength of the entire spark plug cap against the spark plug tightening torque is excellent, and the strength of the both engagement parts between the plug wrench and the housing 31 and between the housing 31 and the spark plug 25 is sufficient.

On the other hand, since the protruded clamp part 35 for holding the sensor output cable 25e is protruded from the outer side surface of the cylindrical part 11, the diameter of the cylindrical part 11 including the protruded clamp part 35 is 21.5 mm (20 mm+1.5 mm), and is larger than the diameter of the cylindrical part 11 itself. However, the diameter of the sensor output cable 25e is generally about 1.5 mm. Additionally, when the height of the protruded clamp part 35 is equal to the diameter of the sensor output cable 25e, the cable can be held. Therefore, the diameter of the cylindrical part 11 including the protruded clamp part 35 can be set to at least 24 mm or less.

Moreover, since the spring 13 is disposed in the center axis part of the rubber insulating part 33 superior in insulating properties, the insulating performance can be raised.

Therefore, according to the spark plug cap 3 of the second embodiment, in addition to the effect of the spark plug cap 1 of the first embodiment, the strength against the spark plug tightening torque can be increased, and the diameter can further be reduced. This can secure a wider space for disposing the mechanism of the suction and exhaust valves in the cylinder head.

Additionally, the material of the insulating 33 is not limited to rubber, and a resin material and other materials superior in insulating properties can preferably be used. Moreover, the insulating part 33 may be formed, for example, by forming an injection hole for injecting the resin in the side surface of the housing 31 and performing the insert molding using the injection hole. Furthermore, it is preferable that the metal material forming the housing 31 be strong against the spark plug fastening torque and superior in anticorrosion, and should be used at a low cost. Moreover, the protruded clamp part 35 is disposed on two places in the second embodiment, but may be disposed only on one place.

Furthermore, when on the side of the second engagement part 17, the end of the cylindrical part 11 constituting the spark plug cap 3 of the second embodiment is bonded to the metal shell of the spark plug 25 by caulking or welding, and the spark plug cap 3 is formed integrally with the spark plug 25, the spark plug cap 3 can securely be prevented from falling from the spark plug 25 during the fitting of the spark plug 25.

Additionally, in the spark plug with a built-in pressure sensor 25, the weight of the spark plug cap is preferably light in order to precisely detect the cylinder inner pressure of the internal combustion engine.

Third Embodiment

For the spark plug cap formed using the metal material, a lightened spark plug cap will next be described. The spark plug cap of a third embodiment is different from the spark plug cap 3 of the second embodiment only in the structure of the cylindrical part, and the structure of the cylindrical part of the third embodiment will be described with reference to FIGS. 5A to 5D.

Figure 5A:
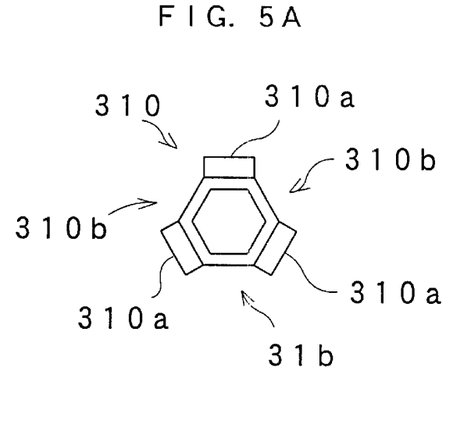
FIG. 5A is a plan view showing a housing of the cylindrical part of the spark plug cap according to a third embodiment.
Figures 5B, 5D:
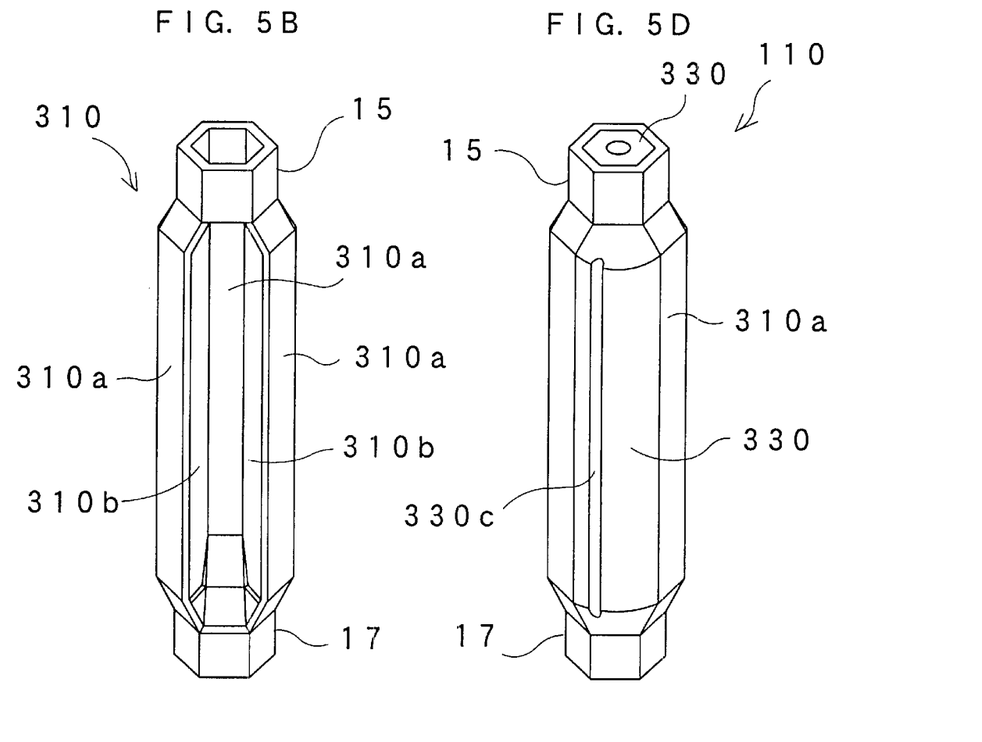
FIG. 5B is a perspective view of the cylindrical part shown in FIG. 5A.
FIG. 5D is a perspective view of the housing filled with the insulating material shown in FIG. 5C.

As shown in FIGS. 5A and 5B, for the housing 310 of the cylindrical part 110 constituting the spark plug cap of the third embodiment, one end is provided with the first engagement part 15 whose hexagonal shape can engage with the spark plug fastening tool. Moreover, the other end of the housing 310 is provided with the second engagement part 17 formed of the metal material whose recessed hexagonal shape can engage with the hexagonal part 25a disposed to fasten the spark plug 25. Furthermore, in the housing 310, the middle part between the first engagement part 15 and the second engagement part 17 is formed by three frame parts 310a, and a hollow or notch part 310b is formed among the frame parts 310a adjacent to one another.

Additionally, in the third embodiment, the distance between the opposite sides of the first engagement part 15 is 13 mm, and the recessed hexagonal shape of the second engagement part 17 is of a size such that the part can engage with the hexagonal part 25a whose distance between the opposite sides is 14 mm.

Figure 5C:
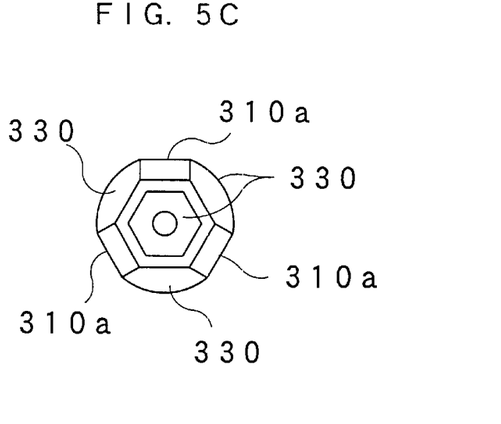
FIG. 5C is a plan view showing that the housing is filled with an insulating material.

Moreover, the cylindrical part 110 is formed as shown in FIGS. 5C, 5D by forming the insulating part 330 of the rubber material so that the spring 13 of the conductive material is extended along the center axis of the housing 310 in the longitudinal direction. In this case, for the outer side surface of the cylindrical part 110, a groove-shaped clamp part 330c with a depth of 1.5 mm and opening width of 1.5 mm extended in the longitudinal direction is disposed on the outer side surface of the insulating part 330 exposed from the notch part 310b, so that the sensor output cable 25e can be held.

Therefore, the housing 310 of the metal material provides the cylindrical part 110 constituting the spark plug cap of the third embodiment with a sufficient strength against the spark plug fastening strength, and the influence of the cylinder inner pressure onto the detection precision is reduced by providing the notch part 310b to lighten the spark plug cap.

Moreover, since the clamp part 330c for holding the sensor output cable 25e can be disposed without increasing the diameter of the cylindrical part 110, the diameter of the spark plug hole can further be reduced.

Additionally, needless to say, similarly as the spark plug caps of the first and second embodiments, the spark plug cap of the third embodiment produces the effects that the detaching/fitting operation of the spark plug with a built-in pressure sensor with respect to the internal combustion engine is facilitated and that the spark plug hole is prevented from being scraped.

Figure 6:
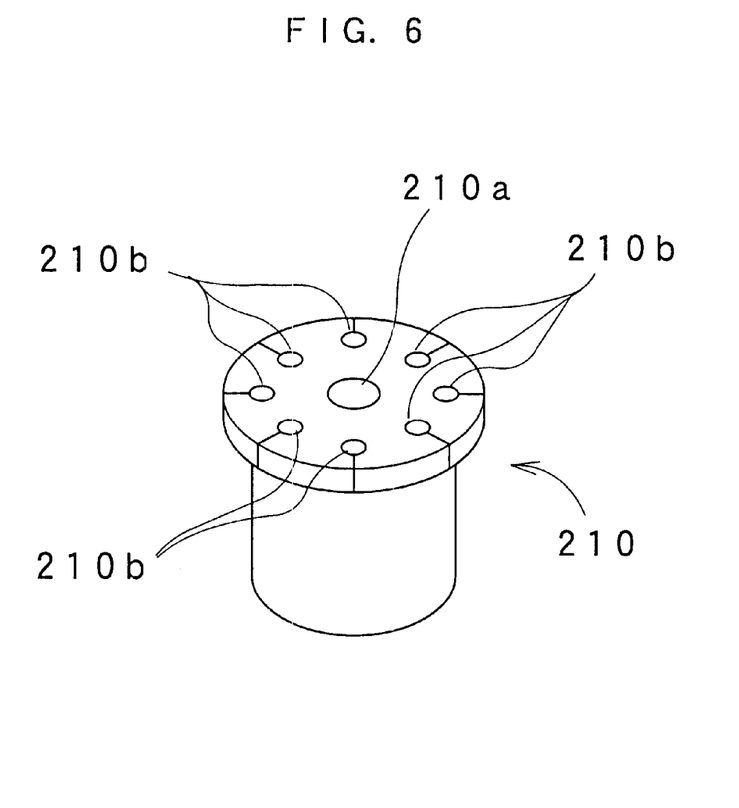
FIG. 6 is a perspective view showing a grommet provided with a plurality of cable passing grooves.

Moreover, in the above-described embodiments, a single cable passing groove is disposed in the grommet, but as shown in FIG. 6, a plurality of cable passing grooves 210b may be arranged at equal intervals in the peripheral direction of the top surface centering on the through hole 210a.

Specifically, by arranging a plurality of cable passing grooves 210b, the position to extract the sensor output cable 25e can be selected from the plurality of cable passing grooves 210b, even when the attachment direction of the grommet 210 is determined in a definite direction with respect to the internal combustion engine. Therefore, the connector 25f can easily be connected to the external apparatus.

Fourth Embodiment

A spark plug cap 7 will next be described as a fourth embodiment in which a cable arrangement part for arranging the sensor output cable is disposed inside.

Figures 7A, 7B:
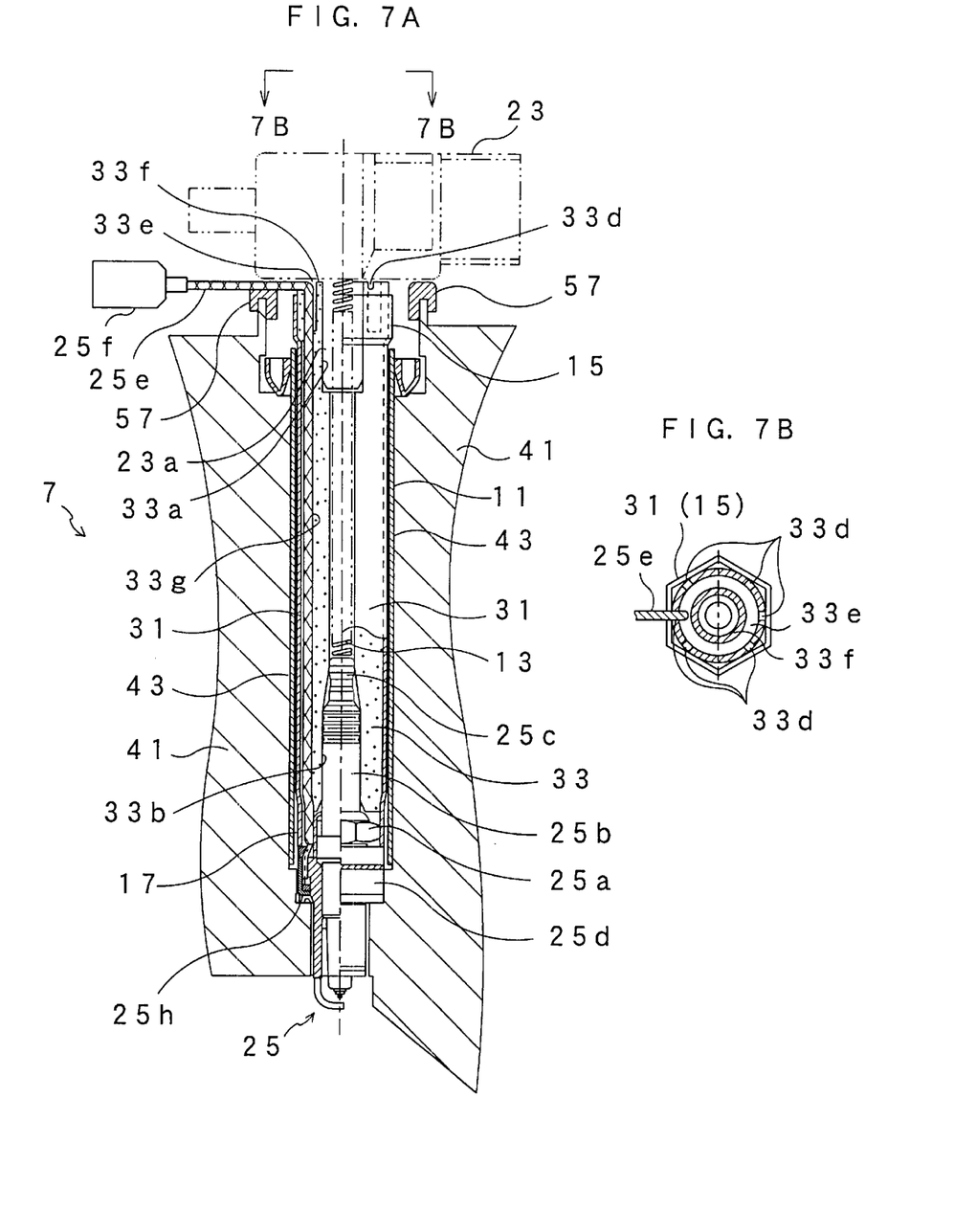
FIG. 7A is a schematic view of the spark plug cap of a fourth embodiment as seen from a lateral direction.
FIG. 7B is an outer shape diagram of the spark plug cap of the fourth embodiment as seen from an upward direction (viewed along line 7B—7B)

As shown in FIG. 7A, the spark plug cap 7 of the fourth embodiment comprises the cylindrical member 11 including the housing 31 of the cylindrical metal material, and the outer diameter of the center part of the housing 31 in the longitudinal direction is 22 mm. Moreover, for the spark plug cap 7, one end of the housing 31 is provided with the first engagement part 15 whose hexagonal shape can engage with the spark plug fastening tool, and the other end is provided with the second engagement part 17 whose recessed hexagonal shape can engage with the hexagonal part 25a disposed to fasten the spark plug 25. Additionally, in the fourth embodiment, the distance between the opposite sides of the first engaging part 15 is 24 mm, and the recessed hexagonal shape of the second engagement part 17 is of a size such that the part can engage with the hexagonal part 25a with the distance between the opposite side of 16 mm.

Moreover, the insulating part 33 of silicon rubber is held inside the housing 31, so that the spring 13 of the conductive material can be extended along the center axis of the housing 31 in the longitudinal direction. Furthermore, for the inner wall of the insulating part 33, the inner wall of the first engagement part 15 is provided with the high voltage terminal contact part 33a shaped so that the high voltage terminal 23a of the ignition coil unit 23 can be held. Moreover, the inner wall adjacent to the second engagement part 17 on the side of the first engagement part 15 is provided with the spark plug contact part 33b shaped so that the insulator 25b of the spark plug 25 can be held.

Additionally, the insulating part 33 is provided with a cable arrangement part 33g for disposing the sensor output cable 25e of the spark plug with a built-in pressure sensor 25. The cable arrangement part is defined as a hollow extended to the end on the side of the first engagement part 15 from the end on the side of the second engagement part 17. Moreover, the sensor output cable 25e is connected to a piezoelectric element 25h in the spark plug with a built-in pressure sensor 25, and the surface is covered with a stainless steel mesh in order to inhibit the noise influence.

Furthermore, the end of the insulating part 33 on the side of the first engagement part 15 is protruded from the end of the housing 31, and this protruded part is provided with six cable extraction parts or recesses 33d (see FIG. 7B). The cable extraction parts 33d are arranged in the peripheral direction about the center axis of the spark plug cap 7 to which the high voltage terminal 23a is inserted, so that the extraction direction of the sensor output cable 25e can be selected.

Additionally, the end of the insulating part 33 on the side of the first engagement part 15 is provided with a partition part 33f formed like a wall to surround the periphery of the center axis of the spark plug cap 7, so that the center axis part of the spark plug cap 7 with the high voltage terminal 23a inserted therein is separated from a cable arrangement groove 33e for disposing the sensor output cable 25e (see FIG. 7B). Moreover, in the cable arrangement groove 33e, the sensor output cable 25e is disposed/extended from the end of the cable arrangement part 33g on the side of the first engagement part 15 to the cable extraction part 33d.

A method of fitting the spark plug cap 7 of the fourth embodiment into the spark plug with a built-in pressure sensor 25 will next be described. First, the connector 25f connected to the end of the sensor output cable 25e of the spark plug 25 is inserted into the housing 31 from the side of the second engagement part 17 of the housing 31 with no insulating part 33 attached thereto, and extracted from the side of the first engagement part 15. The hexagonal part 25a is then engaged with the second engagement part 17. In this case, the sensor output cable 25e is held in the housing 31 to such an extent that the cable is not loosened. Subsequently, the cable arrangement part 33g disposed in the insulating part 33 is positioned with respect to the sensor output cable 25e, the insulating part 33 is inserted from the side of the first engagement part 15 of the housing 31 toward the second engagement part 17, and the insulator 25b of the spark plug 25 is held by the spark plug contact part 33b.

Moreover, in order to mount the spark plug with a built-in pressure sensor 25 provided with the spark plug cap 7 on the internal combustion engine, first the spark plug 25 with the spark plug cap 7 fitted thereto is inserted from the ground electrode side into a spark plug hole 43 formed in an internal combustion engine cylinder head 41. Subsequently, the connector 25f connected to the end of the sensor output cable 25e is tentatively inserted in the high voltage terminal contact part 33a. Thereafter, the spark plug fastening tool is fitted in the first engagement part 15, and the spark plug cap 7 and spark plug 25 are simultaneously rotated and fastened by the spark plug fastening tool, so that the spark plug 25 provided with the spark plug cap 7 is mounted on the internal combustion engine.

After mounting the spark plug cap 7 on the internal combustion engine, the connector 25f is extracted from the high voltage terminal contact part 33a, and the sensor output cable 25e is extracted to the outside from the optimum cable extraction part 33d selected as the sensor output cable extraction direction from the six cable extraction parts 33d.

Thereafter, the high voltage terminal 23a is inserted into the high voltage terminal contact part 33a, the ignition coil unit 23 is mounted on the spark plug cap 7, and the ignition coil unit 23 is further fixed to the internal combustion engine man body by a fixing bolt (not shown). By mounting the ignition coil unit 23 on the spark plug cap 7 in this manner, the spring 13 is brought in contact with the high voltage terminal 23a, and the conductive path for applying the igniting high voltage is formed. Moreover, the connector 25f is connected to the complementary connector connected to the external apparatuses such as the electronic controller, and a signal path for transmitting an electric signal in accordance with a detected pressure is formed.

Additionally, in this case, the ignition coil unit 23 abuts on an annular seat part 57 formed on the upper part of the cylinder head 41 around the center axis of the spark plug hole 43, and this prevents water, and the like from entering the spark plug hole. Therefore, in the fourth embodiment, no grommet is used.

As described above, according to the spark plug cap 7 of the fourth embodiment, since the cable arrangement part 33g is disposed inside the spark plug cap 7, that is, inside the housing 31, the sensor output cable 25e can securely be prevented from contacting the inner wall of the spark plug hole 43.

Moreover, six cable extraction parts 33d are disposed. Even when the direction of the spark plug with a built-in pressure sensor 25 fitted into the internal combustion engine is not definite, the extraction direction of the sensor output cable 25e can be set to the optimum direction by selecting, from the six cable extraction parts, the cable extraction part 33d via which the sensor output cable 25e can be extracted from the optimum position.

Furthermore, since the partition part 33f is disposed, the sensor output cable 25e can be prevented from crossing the center axis of the spark plug cap 7 in the end on the side of the first engagement part 15, the sensor output cable 25e offers no obstruction during the inserting of the high voltage terminal 23a, and the inserting operation of the high voltage terminal 23a can easily be performed.

Additionally, needless to say, similarly as the respective spark plug caps of the above-described embodiments, the spark plug cap of the fourth embodiment produces the effects that the detaching/fitting operation of the spark plug with a built-in pressure sensor with respect to the internal combustion engine is facilitated and that the spark plug hole is prevented from being scraped.

Fifth Embodiment

A spark plug cap 9 will next be described as a fifth embodiment which is provided with a signal output electrode for outputting the electric signal to the external apparatus in accordance with the detected pressure.

Figure 8A:
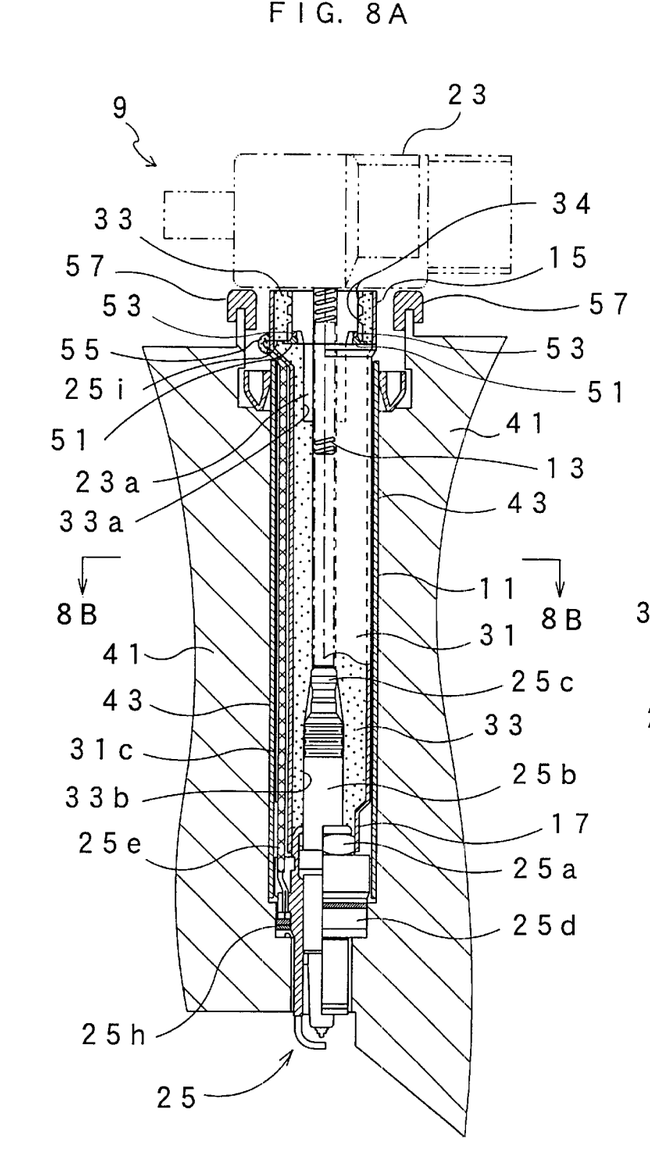
FIG. 8A is a schematic view showing the spark plug cap of a fifth embodiment as seen from the lateral direction.

As shown in FIG. 8A, the spark plug cap 9 of the fifth embodiment comprises the cylindrical member 11 including the housing 31 of the substantially cylindrical metal material, and the outer diameter of the center part of the housing 31 in the longitudinal direction is 22 mm. Moreover, for the spark plug cap 9, one end of the housing 31 is provided with the first engagement part 15 whose hexagonal shape can engage with the spark plug fastening tool, and the other end is provided with the second engagement part 17 whose recessed hexagonal shape can engage with the hexagonal part 25a disposed to fasten the spark plug 25. Additionally, in the fifth embodiment, the distance between the opposite sides of the first engagement part 15 is 24 mm, and the recessed hexagonal shape of the second engagement part 17 is of a size such that the part can engage with the hexagonal part 25a with the distance between the opposite sides of 14 mm.

Figure 8B:
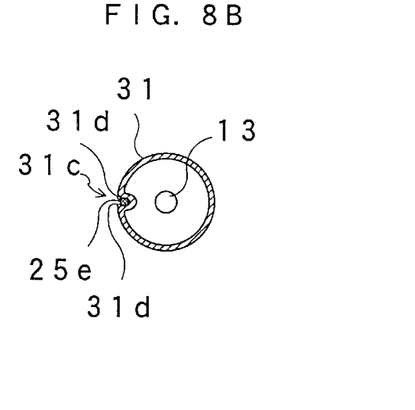
FIG. 8B is a sectional view along line 8B—8B.

Moreover, the outer side surface of the housing 31 is provided with a groove-shaped cable arrangement part 31c extended to the second engagement part 17 from the first engagement part 15. Additionally, as seen from the sectional view of the spark plug cap 9 in, FIG. 8B, the cable arrangement part 31c is provided with a rubber clamp part 31d for holding the sensor output cable 25e. Moreover, the sensor output cable 25e is connected to the piezoelectric element 25h inside the spark plug with a built-in pressure sensor 25, and the surface is covered with the stainless steel mesh in order to inhibit the noise influence.

Furthermore, the insulating part 33 of silicon rubber is formed inside the housing 31 by the insert molding, so that the spring 13 of the conductive material can be extended along the center axis of the housing 31 in the longitudinal direction. Furthermore, the inner wall of the insulating part 33 adjacent to the first engagement part 15 is provided with the high voltage terminal contact part 33a shaped so that the high voltage terminal 23a of the ignition coil unit 23 can be held. Moreover, the inner wall adjacent to the second engagement part 17 on the side of the first engagement part 15 is provided with the spark plug contact part 33b shaped so that the insulator 25b of the spark plug 25 can be held.

Furthermore, on the side of the first engagement part 15 in the insulating part 33, an annular signal output electrode 51 is disposed around the center axis of the spark plug cap 9 to which the high voltage terminal 23a is inserted. Moreover, the signal output electrode 51 is connected to a core line 25i of the sensor output cable 25e inserted via an insertion hole formed in the side surface of the housing 31, and outputs the electric signal to the external apparatus in accordance with the detected pressure.

Furthermore, in order to fit the spark plug cap 9 of the fifth embodiment into the spark plug with a built-in pressure sensor 25, first the spark plug with a built-in pressure sensor 25 is inserted into the spark plug contact part 33b of the spark plug cap 9 from the side of the terminal part 25c, and the hexagonal part 25a is engaged with the second engagement part 17. Thereafter, by holding the sensor output cable 25e by the clump part 31d, the sensor output cable 25e is disposed in the cable arrangement part 31c, and the sensor output cable 25e is disposed/extended to the side of the first engagement part 15 from the side of the second engagement part 17 in the spark plug cap 9.

Subsequently, the core line 25i is extracted from the end of the sensor output cable 25e, the core line 25i is inserted into the housing 31 from the insertion hole of the housing 31, and the core line 25i is connected to the signal output electrode 51 by soldering or welding. Thereafter, the insertion hole is sealed by silicon rubber 55, and the sensor output cable 25e is fixed to the housing 31 by the silicon rubber 55. In this manner, the spark plug cap 9 is mounted on the spark plug with a built-in pressure sensor 25.

Moreover, in order to mount the spark plug 25 provided with the spark plug cap 9 on the internal combustion engine, first the spark plug 25 with the spark plug cap 9 fitted thereto is inserted from the ground electrode side into the spark plug hole 43 in the internal combustion engine cylinder head 41. Subsequently, the spark plug fastening tool is fitted in the first engagement part 15, and the spark plug cap 9 and spark plug 25 are simultaneously rotated and fastened by the spark plug fastening tool, so that the spark plug 25 provided with the spark plug cap 9 is mounted on the internal combustion engine.

Thereafter, the high voltage terminal 23a is inserted into the high voltage terminal contact part 33a, the ignition coil unit 23 is mounted on the spark plug cap 9, and the ignition coil unit 23 is further fixed to the internal combustion engine main body by the fixing bolt (not shown). By mounting the ignition coil unit 23 on the spark plug cap 9 in this manner, the spring 13 is brought in contact with the high voltage terminal 23a, and the conductive path for applying the igniting high voltage is formed.

Moreover, the periphery of the high voltage terminal 23a is provided with an annular external apparatus side electrode 53. When the ignition coil unit 23 is attached to the spark plug cap 9, the external apparatus side electrode 53 abuts on the signal output electrode 51 disposed in the spark plug cap 9. Therefore, the signal output electrode 51 is electrically connected to the external apparatus side electrode 53, and the signal path for transmitting the electric signal in accordance with the detected pressure is formed. Additionally, the external apparatus side electrode 53 is connected to the external apparatuses such as the electronic controller.

Additionally, in this case, the ignition coil unit 23 abuts on the annular seat part 57 formed on the upper part of the cylinder head 41 centering on the center axis of the spark plug hole 43, and this prevents water, and the like from entering the spark plug hole. Therefore, also in the fifth embodiment, no grommet is used.

Moreover, the close contact of a protruded part 34 formed on the inner periphery of the high voltage terminal contact part 33a of the insulating part 33 to the cylindrical outer periphery of the high voltage terminal 23a prevents water, and the like from entering, and provides the signal output electrode 51 and external apparatus side electrode 53 with waterproofness.

As described above, according to the spark plug cap 9 of the fifth embodiment, in accordance with the detected pressure, the electric signal is outputted to the external apparatuses such as the electronic controller via the signal output electrode 51 disposed on the spark plug cap 9 on the side of the first engagement part 15, instead of the connector attached to the end of the sensor output cable 25e. Moreover, in the constitution, by inserting the high voltage terminal 23a into the high voltage terminal contact part 33a, the external apparatus side electrode 53 disposed on the periphery of the high voltage terminal 23a contacts the signal output electrode 51 disposed on the spark plug cap 9.

Thereby, since the electric signal can be outputted to the external apparatuses in accordance with the detected pressure without attaching the connector to the end of the sensor output cable 25e, the connector can be omitted, and space saving can be achieved. Moreover, since the signal output electrode 51 contacts the external apparatus side electrode 53 by inserting the high voltage terminal 23a into the high voltage terminal contact part 33a, the connecting operation of the spark plug with a built-in pressure sensor to the external apparatus can be completed once with respect to two systems for the igniting high voltage and pressure detection signal, so that the connecting operation can be simplified.

Additionally, needless to say, similarly as the respective spark plug caps of the above-described embodiments, the spark plug cap of the fifth embodiment produces the effects that the detaching/fitting operation of the spark plug with a built-in pressure sensor with respect to the internal combustion engine is facilitated and that the spark plug hole is prevented from being scraped.

The embodiments of the present invention have been described above, but the present invention is not limited to these embodiments, and can be modified variously.

For example, the spark plug cap may be formed so that the first engagement part is positioned outside the spark plug hole when the spark plug with a built-in pressure sensor provided with the spark plug cap is inserted to the spark plug bole. In this case, as the spark plug fastening tool, instead of the box wrench which covers the first engagement part, a spanner or another spark plug fastening tool can be used which abuts on two parallel surfaces of the hexagonal shape of the first engagement part and holds the first engagement part.

Moreover, for the spark plug cap provided with the cable extraction parts as in the fourth embodiment, the number of cable extraction parts is not limited to six, and the necessary number of cable extraction parts may be disposed.

Additionally, the spark plug can be prevented from falling from the spark plug cap during the fitting/detaching of the spark plug by integrally and indivisibly constituting the above-described spark plug cap with the spark plug with a built-in pressure sensor beforehand by welding. However, since the resonance frequency of the spark plug with a built-in pressure sensor integral with the spark plug cap is close to a knocking frequency, the vibration of the spark plug with a built-in pressure sensor integral with the spark plug cap generated by the vibration of the internal combustion engine is possibly detected incorrectly as a knocking. Therefore, when the detection signal of the pressure sensor is used to detect the knocking, during the use of the spark plug with a built-in pressure sensor integral with the spark plug cap, the knocking detection precision is lowered in some cases.

Therefore, it is undesirable to integrally and indivisibly constitute the spark plug cap with the spark plug. When the spark plug integral with the spark plug cap is still used, the resonance frequency may be set to be other than the vicinity of the knocking frequency.

What is claimed is:

1. A cylindrical spark plug cap which is fitted into a spark plug with a built-in pressure sensor and which is provided with a conductive path for applying an igniting high voltage to the spark plug and an insulating member for insulating the conductive path, said spark plug cap comprising:
    a cylindrical member including a first engagement part for engaging with a fastening tool on one end of said cylindrical member and a second engagement part for engaging with the spark plug on the other end of said cylindrical member; and
    a cable engaging part for extending a sensor output cable through said cylindrical member, along a longitudinal direction of said cylindrical member, from the one end that includes said first engagement part to the other end that includes said second engagement part.

2. The spark plug cap according to claim 1, wherein said cable engaging part includes a groove which has a sectional shape for accommodating said sensor output cable.

3. The spark plug cap according to claim 1, wherein at least one of said first engagement part and said second engagement part is formed of a metal material.

4. The spark plug cap according to claim 1, wherein said cylindrical member includes a housing formed of a metal material, and said conductive path and an insulating member for insulating the conductive path are accommodated inside the housing.

5. The spark plug cap according to claim 1, wherein the end of said cylindrical member having said first engagement part is provided with a plurality of cable extraction parts, and the extraction direction of said sensor output cable can be selected by using any one of the plurality of cable extraction parts.

6. The spark plug cap according to claim 5, wherein a partition part for preventing a high voltage terminal inserted from the end of said cylindrical member on the side of said first engagement part to apply the igniting high voltage from contacting said sensor output cable is disposed in said cylindrical member.

7. The spark plug cap according to claim 1, further comprising: a signal output electrode, disposed on the end of said cylindrical member provided with said first engagement part and electrically connected to said sensor output cable.

8. The spark plug cap according to claim 1, further comprising: a grommet for covering the opening end of a spark plug hole disposed in an internal combustion engine for containing said spark plug and the spark plug cap, and provided with a through hole for passing the conductive path for applying the igniting high voltage to said spark plug,
    wherein the grommet is provided with a cable passing groove for passing said sensor output cable to the outside of said spark plug hole.

9. The spark plug cap according to claim 1, further comprising: an ignition coil part provided with a high voltage terminal for outputting the igniting high voltage.

10. A cylindrical spark plug cap which is fitted into a spark plug with a built-in pressure sensor and which is provided with a conductive path for applying an igniting high voltage to the spark plug and an insulating member for insulating the conductive path, said spark plug cap comprising:

a cylindrical member including a first engagement part for engaging with a fastening tool on one end and a second engagement part for engaging with the spark plug on the other end; and a cable engaging part for extending a sensor output cable through said cylindrical member from an end on the side of said first engagement part to an end on the side of said second engagement part, wherein said cylindrical member includes a housing formed of a metal material, and said conductive path and an insulating member for insulating the conductive path are accommodated inside the housing, wherein said housing comprises a notch part, and the insulating member exposed from said notch part is provided with a groove for engaging with said sensor output cable.

11. A method of using a spark plug cap and fitting the spark plug with a built-in pressure sensor into a spark plug hole in an internal combustion engine, wherein the spark plug includes a cylindrical member including a first engagement part for engaging with a fastening tool on one end of the cylindrical member and a second engagement part for engaging with the spark plug on the other end of the cylindrical member, and a cable engaging part for extending a sensor output cable through the cylindrical member, along its longitudinal direction, from the end that includes the first engagement part to the other end that includes the second engagement part, comprising:

engaging said second engagement part of said cylindrical member with the spark plug with a built-in pressure sensor;

engaging said sensor output cable with the cable engaging part of said cylindrical member; and fitting the fastening tool in said first engagement part of said cylindrical member, rotating the fastening tool while said sensor output cable engages with said the cable engaging part, and screwing said spark plug with a built-in pressure sensor to the spark plug bole of the internal, combustion engine.

12. A method of using a spark plug cap and fitting the spark plug with a built-in pressure sensor into a spark plug hole in an internal combustion engine, wherein the spark plug includes a cylindrical member including a first engagement part for engaging with a fastening tool on one end and a second engagement part for engaging with the spark plug on the other end, and a cable engaging part for extending a sensor output cable through the cylindrical member from the one end having the first engagement part to the other end having the second engagement part, comprising:

engaging said second engagement part of said cylindrical member with the spark plug with a built-in pressure sensor;

engaging said sensor output cable with the cable engaging part of said cylindrical member;

fitting the fastening tool in said first engagement part of said cylindrical member, rotating the fastening tool while said sensor output cable engages with the cable engaging part, and screwing said spark plug with a built-in pressure sensor to the spark plug hole of the internal combustion engine; and fixing the ignition coil part to an internal combustion engine main body while said high voltage terminal is engaged with the end of said cylindrical member with said first engagement part, so that said ignition coil part is fixed to the internal combustion engine main body separately from said spark plug with a built-in pressure sensor.

* * * * *